US011252542B2

(12) United States Patent
Wheeler

(10) Patent No.: US 11,252,542 B2
(45) Date of Patent: Feb. 15, 2022

(54) MOBILE DEVICE COMMUNICATION WITHOUT NETWORK CONNECTION

(71) Applicant: Waggle Corporation, Tampa, FL (US)

(72) Inventor: Glen Wheeler, Tampa, FL (US)

(*) Notice: Subject to any disclaimer, the term of this patent is extended or adjusted under 35 U.S.C. 154(b) by 32 days.

(21) Appl. No.: 16/907,009

(22) Filed: Jun. 19, 2020

(65) Prior Publication Data

US 2021/0400443 A1 Dec. 23, 2021

(51) Int. Cl.
| | | |
|---|---|---|
| *H04W 4/20* | (2018.01) | |
| *H04W 8/26* | (2009.01) | |
| *H04W 4/80* | (2018.01) | |
| *H04W 4/029* | (2018.01) | |

(52) U.S. Cl.
CPC ............ *H04W 4/20* (2013.01); *H04W 4/029* (2018.02); *H04W 4/80* (2018.02); *H04W 8/26* (2013.01)

(58) Field of Classification Search
CPC ......... H04W 4/20; H04W 4/029; H04W 4/80; H04W 8/26; G06F 21/00; G06F 21/42; G06F 21/45; G06F 21/602; G06F 21/31; G06F 2221/2115; G06K 19/06028; G06K 19/06037; G06K 7/10544; H04L 63/0428; H04L 63/08; H04L 63/083; H04L 63/0853; H04L 63/102; H04L 61/103; H04L 61/2007; H04L 61/2092; H04L 63/0815; H04L 67/1251
See application file for complete search history.

(56) References Cited

U.S. PATENT DOCUMENTS

| | | | |
|---|---|---|---|
| 10,158,532 B1* | 12/2018 | Meredith | H04L 41/0896 |
| 10,602,362 B2* | 3/2020 | Chen | H04W 12/06 |
| 10,609,626 B2* | 3/2020 | Lin | H04L 12/2816 |
| 10,652,097 B2* | 5/2020 | Killadi | H04L 12/4641 |
| 10,930,277 B2* | 2/2021 | David | G10L 15/26 |
| 11,063,934 B2* | 7/2021 | Zhou | H04L 67/26 |
| 2015/0141005 A1* | 5/2015 | Suryavanshi | H04W 48/16 455/434 |
| 2016/0330077 A1* | 11/2016 | Jin | H04L 41/0806 |
| 2019/0116479 A1* | 4/2019 | Wheeler | H04W 4/50 |
| 2019/0281532 A1* | 9/2019 | Yu | H04L 43/062 |
| 2019/0342930 A1* | 11/2019 | Beattie | H04W 4/029 |
| 2021/0021519 A1* | 1/2021 | Lynn, Jr | H04L 12/4633 |
| 2021/0321296 A1* | 10/2021 | Sevindik | H04W 24/08 |

* cited by examiner

*Primary Examiner* — Khawar Iqbal
(74) *Attorney, Agent, or Firm* — Justin Luby

(57) ABSTRACT

The present invention utilizes an application which is loaded onto the mobile devices of attendees who will be attending festivals, concerts, etc, where the large crowds attending the event will create wireless and mobile network congestion. The application will enable the attendees and promoters to communicate without the need for a network connection. Communication and instructions are communicated between attendees and promoters using encoded network signals.

1 Claim, 9 Drawing Sheets

MOBILE DEVICE COMMUNICATION WITHOUT NETWORK CONNECTION

CROSS-REFERENCE TO RELATED APPLICATIONS

Not Applicable

FIELD OF THE INVENTION

The present invention relates generally to wireless networking and more specifically communication between networks and mobile devices.

BACKGROUND

When a large number of wireless devices are located in close proximity to each other, congestion will occur in the networks servicing these devices, and the effectiveness of these devices to receive data will be severely impaired, limiting the functionality of these devices.

Network congestion is a common occurrence at largely attended events such as concerts and sporting events. The large number of mobile devices located in the confines of the venues for these events, coupled with the tendency of people to post pictures to social media while they are at these events, as well live stream the events from their mobile devices, requires bandwidth which exceeds what the cellular networks can provide.

Wireless network providers have created a number of strategies to alleviate the congestion issues at these heavily attended events, such as the deployment of mobile cell sites, rapid deployment units (RDUs), cells on wheels (COWs) and cells on truck (COTs). These types of devices can help alleviate network congestion, but typically are more effective at providing functionality to lower bandwidth activities, such as texting and voice calls, than activities which require a larger amount of network bandwidth, such as transmitting photographs and live streaming. Additionally, situations exist where deployment of mobile cell sites is inadequate to support even low bandwidth activities due to signal saturation issues.

Large venues which host these types of crowded events regularly, such as stadiums, can most effectively combat this network congestion through the installation of a WI-FI network at the venue which offers an alternative method of providing wireless data to mobile devices. However, even the most sophisticated WI-FI networks at these venues will have difficulty supporting communication between tens of thousands of mobile devices simultaneously.

The limitation of not being able to communicate using mobile devices during largely attended events such as concerts, also limits the ability of attendees to stay in contact with each other during the event.

Attendees may wish to communicate to each other by text messaging their locations, their emotions during the event, their requests for food/beverage, etc. Due to the network congestion and/or signal saturation experienced at these events, the ability to send and receive text messages may be impaired, or the messages may be severely delayed, rendering the messages ineffective, or even confusing when received.

Additionally, event promoters may wish to gather real time information from the mobile devices as the event unfolds, such as tracking the activities of the attendees at the event to see what portions of the events they attended and when. Without the establishment of a network connection, current technology prevents event promoters from gathering information real-time from the devices during the event.

U.S. Pat. Nos. 10,536,832, 10,154,396 and 10,674,335 by the current inventor (Wheeler), teach a method of using WIFI transmitters and mobile devices to track the activities of the attendees at the event. However, the method(s) taught involve storing the location data on the mobile device while the device is at the venue, and then transmitting that information to the event promoters once the mobile device has left the event and is in a location where the network congestion no longer occurs. This method does not allow for real time collection of this data, nor does it allow for communication between devices.

Thus, there exists a need for a method to allow multiple mobile devices to communicate between the devices while at an event where legacy network communications are not possible.

Furthermore, there exists an additional need for a method to allow a device to be location-tracked throughout an event venue where typical network communications are not possible, where the location tracking is data is transmitted to the event promoter real-time.

SUMMARY

To accomplish this objective, the method of the present invention utilizes an application which is loaded onto the mobile devices of attendees who will be attending festivals, concerts, etc, where the large crowds attending the event will not be able to use typical networking such as cellular or wireless networks. The application will be pre-configured prior to the event, assigning a unique identifier to the mobile device, which allows the event promoter to recognize the device/device owner.

During the event, attendees will activate the applications loaded on their mobile devices, and the presenter will emit signals from at least one WI-FI transmitter. The transmission will include a unique SSID which is encoded with a set of instructions to cause the device to transmit its unique identifier as an encoded SSID through its internal WI-FI transmitter. A nearby WI-FI detector will recognize the mobile device SSID and record the date, time, identifier and location based on the encoded SSID being transmitted from the mobile device.

The WI-FI mobile devices will not actually connect to the WI-FI network. The broadcast name (SSID) of the WI-FI device will include coded information including a set of instructions for the device to execute. When the mobile devices are in range of the WI-FI signal, the application will decode the signal and follow the instructions. No two-way data exchange on the WI-FI network occurs, therefore, there is no network congestion issue. No network connections are established, therefore, no signal saturation issues occur.

At the event, a multitude of WI-FI transmitters and detectors will be used, with relatively short ranges, so that the promoters can effectively determine the location of the device based on the detectors which are in range of the mobile device SSID transmitted from the mobile device. Mobile device WI-FI transmitters have a limited range, and can be adjusted to limit the range of the signal transmitted. In this way, the event stagers can set up a multitude of WI-FI detectors throughout the event within the designed confines of a stage, booth, etc.

In addition to tracking the activities of the attendees at the event to see what portions of the events they attended and when, in a second embodiment, the method can also be modified to allow limited two-way communication between the attendee and the promoter if the detector(s) are also connected to a central program.

For instance, the application could allow the attendee to type a question, such as "who is next on this stage" into the application on the mobile device. The mobile device would then transmit an encoded SSID which asks the question and includes a unique device identifier. The detector would detect the SSID, transmit the SSID to the central program, which would decipher the question, ascertain the location, lookup the answer, and determine a response. To transmit the response to the device, the transmitter would momentarily change its SSID to a SSID which would include the unique identifier of the mobile device it was responding to, and the response. Alternatively, designated response transmitters, separate from the transmitters used for location tracking, with longer range capability, could be used.

Additionally, in a third embodiment the method can also be modified to allow communication between two or more mobile devices where each mobile device was assigned its own unique identifier.

For instance, the application could allow the attendee to type a question and recipient into the application on the mobile device. The mobile device would then transmit a WIFI identifier (SSID) which would be encoded with the mobile device unique identifier and the question asked. The detector would detect the SSID, transmit the SSID to the central program, determine the location of phone and determine the closest transmitter. To transmit the message to the second device, the transmitter would momentarily change its SSID to a SSID which would include the SSID of the mobile device receiving the message, the SSID of the device sending the message, and the encrypted message. Alternatively, designated response transmitters, separate from the transmitters used for location tracking, with longer range capability, could be used.

DETAILED DESCRIPTION OF THE INVENTION

Communication systems for communicating between attendees at an event and an event promoter or other attendees utilizing five primary components, Controlling Station 101, an Emitting Station 102, a Detecting Station 105, at least one Mobile Device 103 with a Screen, and Application Software 104 loaded on the Mobile Device(s) 103.

Figure 1:
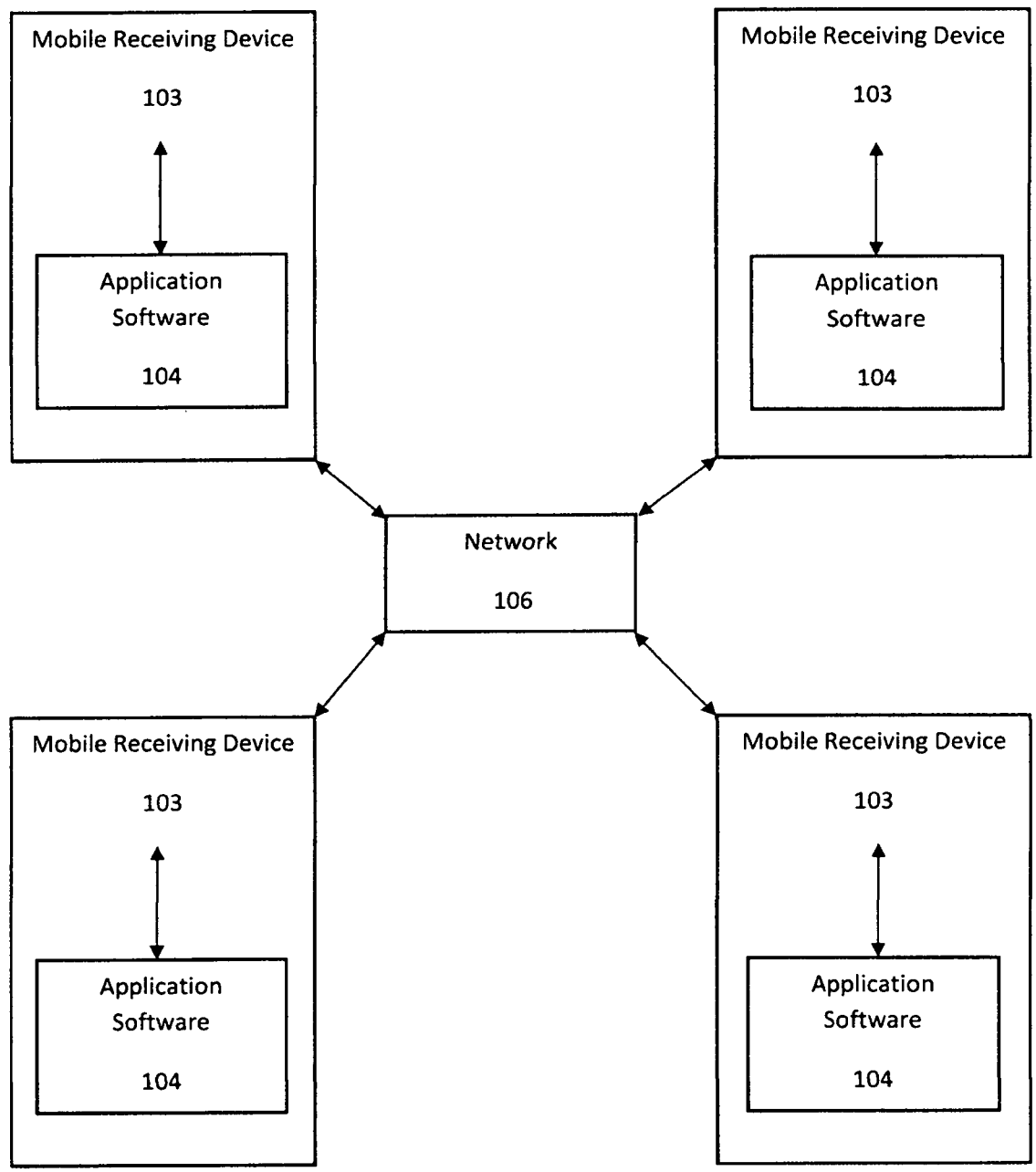
FIG. 1 illustrates a schematic of the prior art communication system, using a network to communicate between multiple mobile devices.

Referring to FIG. 1, conventional communication system using a Mobile Device 103 transmits incoming and outgoing signals via a wireless signal from the Network 106, in the form of a wireless access point, require the Mobile Device 103 to attach to a wireless network 106, negotiate a common communication protocol and begin two-way communication of data. In the conventional method, the Mobile Device 103 will contain an application 104 which is loaded on the device. The Mobile Device 103 will have an application 104 loaded onto the device which is capable of decoding messages from data received from the Network 106 as well as encode messages that are transmitted via data from the Mobile Device 103 to the network. The Mobile Device 103 is required to maintain two way communication with the Wireless Network 106 in order to send and transmit data.

The Application 104 loaded on the Mobile Device 103 can merely decode data received into viewable form on the device, and the data is not required to be stored on the device. This method of Data Transfer minimizes the amount of data which needs to be stored on the Mobile Device 103 to view the presentation, conserving storage on the Mobile Device 103.

Transferring the data necessary to allow communication between tens of thousands of event attendees simultaneously using two-way communication is not feasible using the technology today, including Wi-Fi, Cellular Networks, and short-wavelength UHF radio waves. These networks have bandwidth limitations which cannot support two way communications with thousands of devices simultaneously. The primary limitation of the conventional communication systems of FIG. 1, is that a wireless access point can only have a finite number of Mobile Devices 103 connected to the wireless access point at a given time, which limits the effectiveness of this type of communication in an confined area with a large number of users attempting to connect to the communication system simultaneously.

Figure 2:
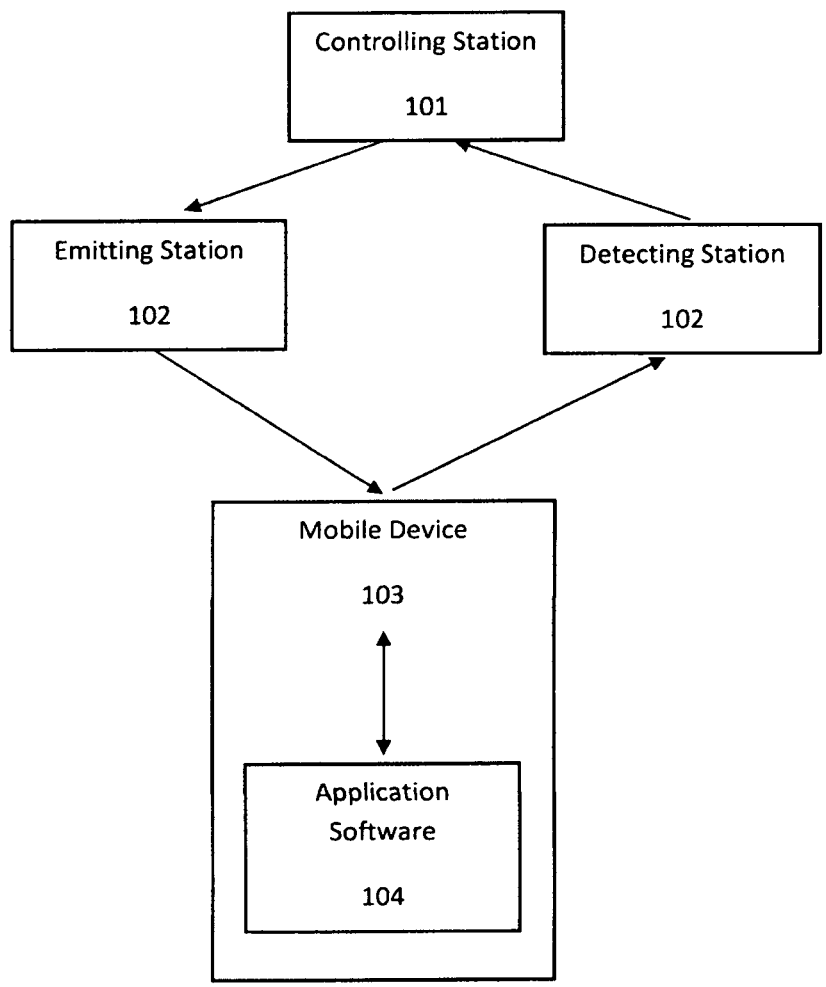
FIG. 2 illustrates a schematic of the first and second embodiments of the communication system of the current invention, using an emitter and detector to track a device at an event, or to communicate between a device and an event promoter.
Figure 3:
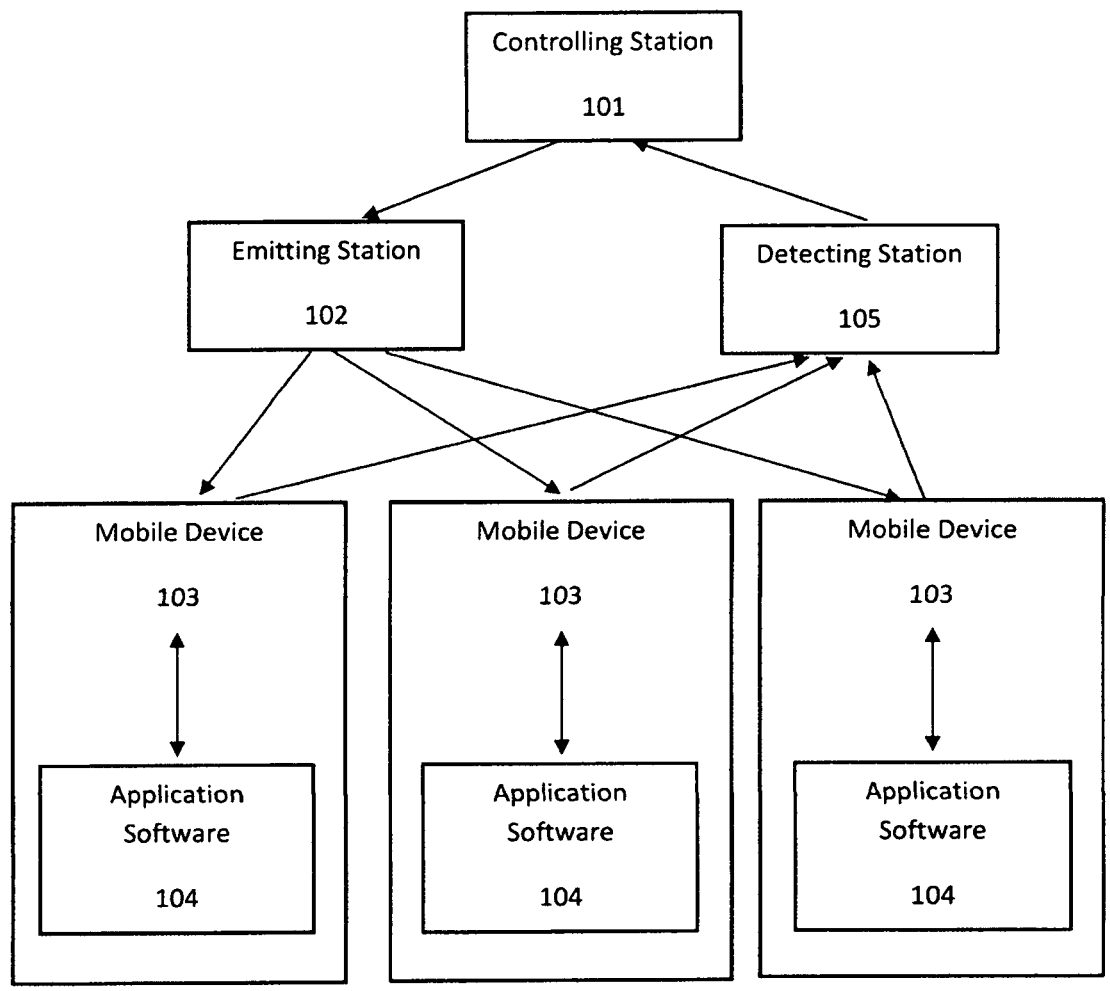
FIG. 3 illustrates a schematic of the third embodiment of the communication system of the current invention, using an emitter and detector to communicate between multiple devices using an emitter and detector.
Figure 4:
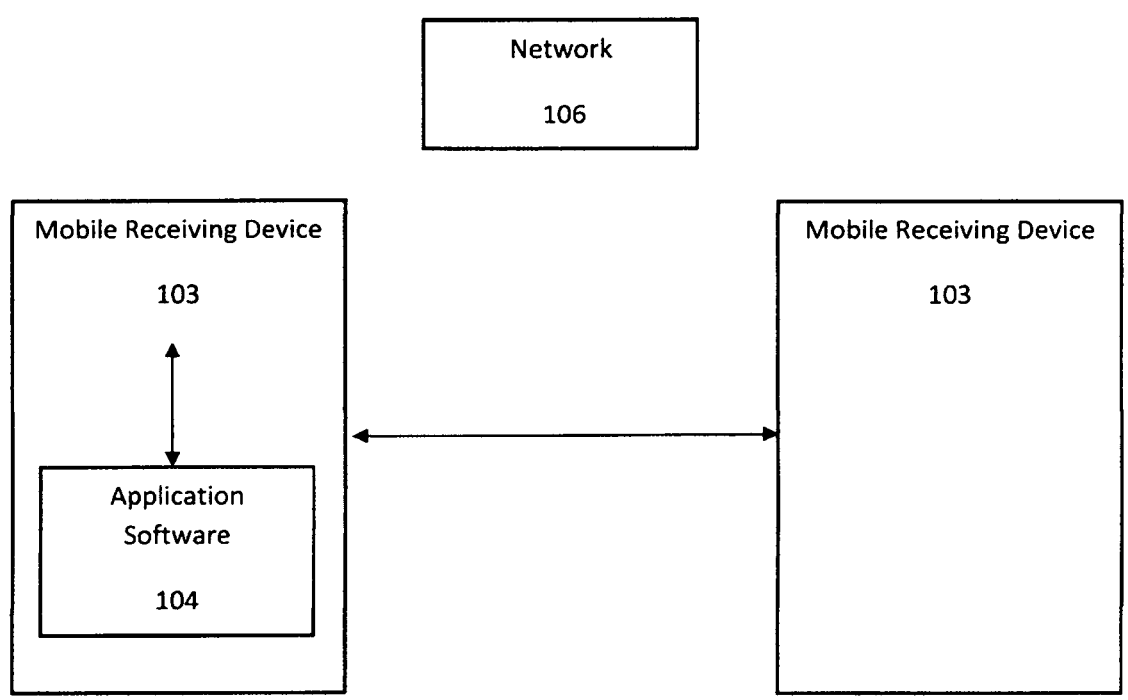
FIG. 4 illustrates a schematic of the fourth embodiment of the communication system of the current invention, using encoded SSIDs to communicate directly between mobile devices.

Referring to FIGS. 2, 3, & 4, the communication system of the current invention provides an alternative means for distributing information to mobile devices via a wireless signal without establishing or requiring a network. This new method negates the need to negotiate a common protocol or attach to a network. Because the communication is one-way and not two-way, there is no limitation on the network for the number of devices it can support.

In the preferred embodiment the Emitting Station(s) 102 is a device capable of emitting an IEEE 802.11x (Wi-Fi) signal and running specialized software written specifically for the purposes described in this patent application. Wireless access points typically emit an identifier called a Service Set Identifier (SSID) which can be read by other Wi-Fi enabled devices. This system converts traditional Wireless Access Points and SSIDs for use as Emitting Stations 102. The corresponding software allows the Emitting Station 102 to accept commands from a Controlling Station 101 (over traditional communication methods). The Controlling Station 101 sends commands which will cause the Emitting Station 102 to change its SSID as directed.

While the Emitting Station 102 in the preferred embodiment of the current invention is a device capable of emitting a Wi-Fi signal, the inventor recognizes that there are a number of devices which are capable of wirelessly emitting a signal with a unique identifier which can be identified by the receiving station. Examples of other technologies which could be utilized as an emitting station 102 for the communication system of the present invention include, but are not limited to, Cellular Networks and short-wavelength UHF radio wave emitters. Additionally, the inventor recognizes that technology surrounding wireless communication is constantly evolving, and intends that this communication system could be adapted to work with developing technology which is capable of wirelessly emitting a signal with a unique identifier which can be identified by the receiving station.

The Mobile Device 103 is any device that is capable recognizing communication networks, capable of emitting a WIFI signal, and is capable of running the corresponding application software. Examples of technologies which could be utilized as a Mobile Device 103 for the communication system of the present invention include, but are not limited to, mobile devices, such as a cell phone or tablet, or computers, both laptops and desktops, which can run the corresponding application software.

Most modern versions of all of the mentioned Mobile Devices 103 have internal WI-FI antennas which allow them not only to receive a WI-FI signal from and emitting station, but also transmit a WI-FI signal, which allows the Mobile Device 103 to send data in a WI-FI network. The Mobile Device 103 internal WI-FI antennas also allow the devices to serve as mobile "hotspots" which creates a secondary network which other devices can connect to, and then transmit data to the Mobile Device 103 which then re-transmits the data to the Network 106. In order for the Mobile Device 103 to create a connectable hotspot, the Mobile Device 103 must also emit an SSID to be discovered. This SSID can be changed by the Mobile Device 103 user, or applications loaded on the Mobile Device 103. The Mobile Device 103 has the ability to modulate the strength of the WI-FI signal it emits, allowing it to control the range of the SSID transmission around the device.

In the preferred embodiment the Detecting Station(s) 105 is a device capable of recognizing a Mobile Device 103 Wi-Fi signal and running specialized software written specifically for the purposes described in this patent application. The Detecting Station 105 could be a stand-alone device, or could also be integrated into the same device as the Emitting Station 102.

In traditional network communications, the user of the IEEE 802.11x (Wi-Fi) capable device must indicate a named network to join so that the device can begin negotiating with the network for a connection before communications can begin. The communication system of the current invention requires only the detection of the SSID by the Mobile Device 103. There is no need for the Mobile Device 103 to attach to the Emitting Station 102, Detecting Station 105, or to any network device. There is also no need for the Mobile Device 103 to send any communication or acknowledgment back to the Emitting Station 102. Unlike a traditional Wi-Fi connection, the Emitting Station 102 does not need to determine if any Mobile Devices 103 are listening or not.

The number of Mobile Devices 103 is limited only by the number of devices that can be physically located within the broadcasting range of the Emitting Station 102. This is a significant advantage over existing network models which are hampered by the number of simultaneous Wi-Fi connections that they can support. Each connection to a traditional Wi-Fi network degrades the performance of the network for all other connected devices. For example, most industrial grade Wi-Fi routers can support a maximum of two hundred and fifty simultaneously connected devices. Bandwidth limitations on a Wi-Fi router would make supporting that many connections impractical. Since this new method repurposes the Wi-Fi router as a broadcaster only, the same Wi-Fi router, when used as an Emitting Station 102, can manipulate thousands of devices at once with no degradation in performance.

The Emitting Station 102 can broadcast instructions and data to any Mobile Device 103 within range. The Mobile Device scans the available detected SSIDs for a pattern match. Once a match is detected, the entirety of the SSID is deciphered by the application software. The SSID name can contain data and instructions that are understood by the Mobile Device 103.

The Controlling Station 101 is any device capable of sending instructions that are interpreted by an Emitting Station 102 and receiving instructions from a Detecting Station 105. The Controlling Station 101 instructs the Emitting Station 102 to change its SSID to a specified name on demand. The Controlling Station 101 is made up of software designed to encode data and commands into an SSID that will be transmitted through the Emitting Station 102 and recognized and decoded by the desired Mobile Device 103 in a specific place at a specific time.

Additionally, the Controlling Station 101 recieves instructions from the Detecting Station 105 detailing the Mobile Device 103 SSIDs which are in range of and can be detected by the Detecting Station 105.

Event promoters make the Application Software 104 available for download to attendees in advance of the event. The Application Software 104 includes a unique Mobile Device 103 SSID for each device, that identifies the device, and device owner to the promoters. Prior to arriving at the event venue, attendees will download and install Application Software 104 on their Mobile Devices 103.

For example, the Controlling Station 101 could send a software command via a traditional local area network (LAN) to an Emitting Station 102. The Emitting Station 102 would interpret the command and change its SSID as instructed.

Part of the SSID name is used by the Mobile Device 103 to establish a pattern match. For example, the Application Software 104 loaded on the Mobile Device 103 could be programmed to look for SSID's that begin with "MMS-COMMAND" or any other predetermined string. The Mobile Device 103 would ignore all SSID's that don't begin with the predetermined string.

The remaining SSID characters are then deciphered by the Mobile Device 103. The characters can be interpreted by the Application Software to execute functions and inject data. In a first embodiment, "MMSCOMMANDUNID" could be broken down as "MMSCOMMAND", and "UNID". "MMSCOMMAND" could cause the Application Software 104 to read the SSID and decipher the remaining characters. "UNID" could be interpreted by the Mobile Device 103 as "transmit WIFI unique identifier". The Mobile Device 103 will then transmit the unique identifier assigned to that device as an encoded SSID (e.x. 5555).

Detecting Stations 105 in range of the Mobile Device 103 emitting the SSID 5555 would detect the SSID and transmit an instruction to the Controlling Station 101 that the device is in range of the Detecting Station 105.

Figure 5:
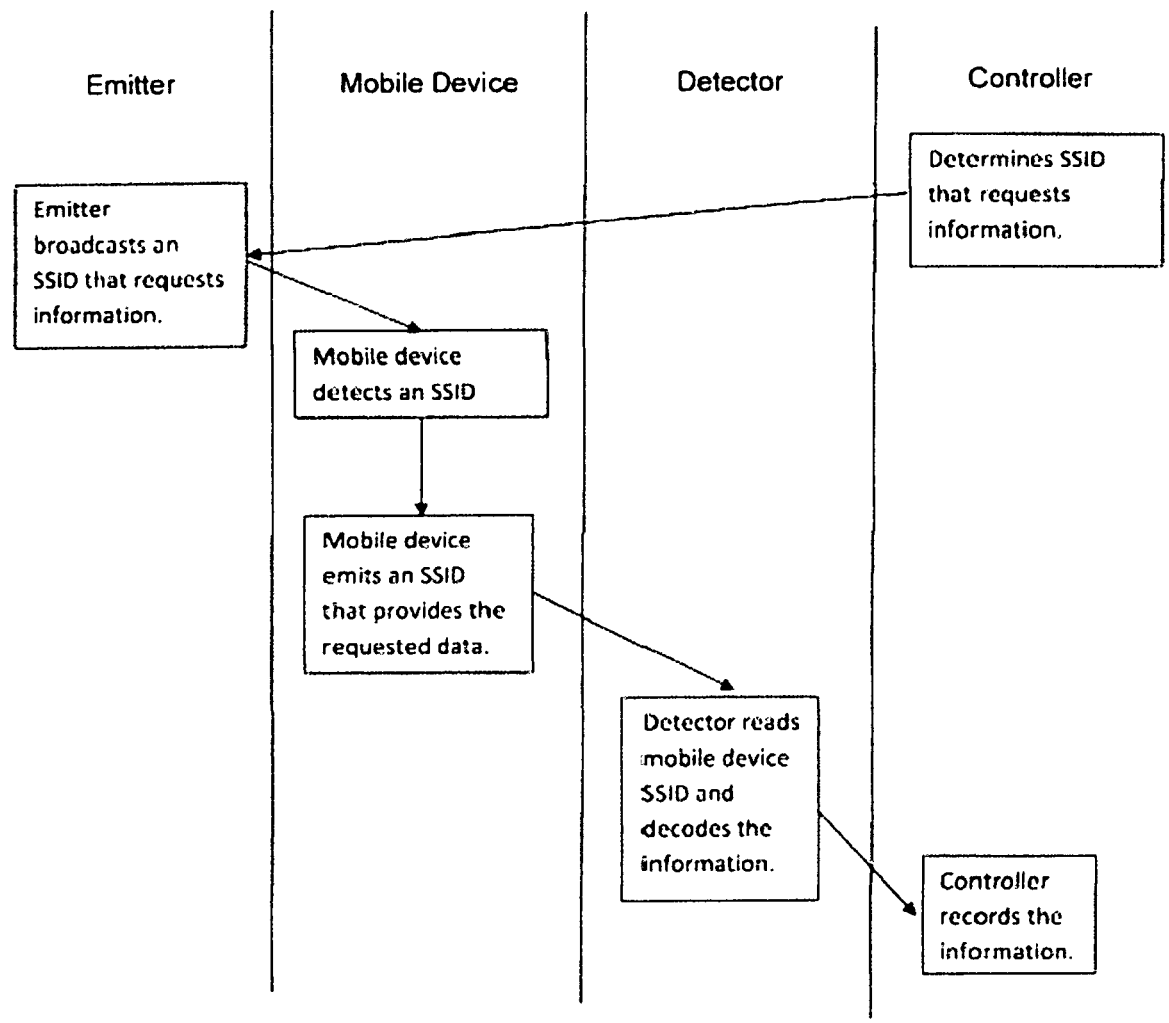
FIG. 5 illustrates a flow chart of the first embodiment of the communication system, depicting the operation of the system for providing an instruction to a mobile device, and receiving a response from the device.

Referring to FIGS. 2 & 5, in a first embodiment of the invention the Emitting Station is utilized to send a communication from a Controlling Station 101 to a Mobile Device 103, such as an instruction to execute a particular operation, such as setting its SSID to a predetermined value. Using this method, the Controlling Station 101 can keep track of all encoded SSID's that it detected by the Detecting Stations 105 and the time and duration of the detection. This method allows for the tracking of devices to determine if and when the device was near particular Detecting Stations 105 without requiring the device to connect with a Network 106. For example, a live event which requires paid admission, could setup Emitting Stations 102 and Detecting Stations 105 throughout the venue. As a patron with a Mobile Device 103 comes within range of an Emitting Station 102, the Application Software 103 will cause the Mobile Device 103 to transmit the assigned unique identifier of the device. As the attendee encounters the various Detecting Stations 105, a record of the encounters is made by the Controlling Station 101, and the promoters of the event can track the movement of the attendee, real time, at the event to see what attractions the attendee visits.

Figure 6:
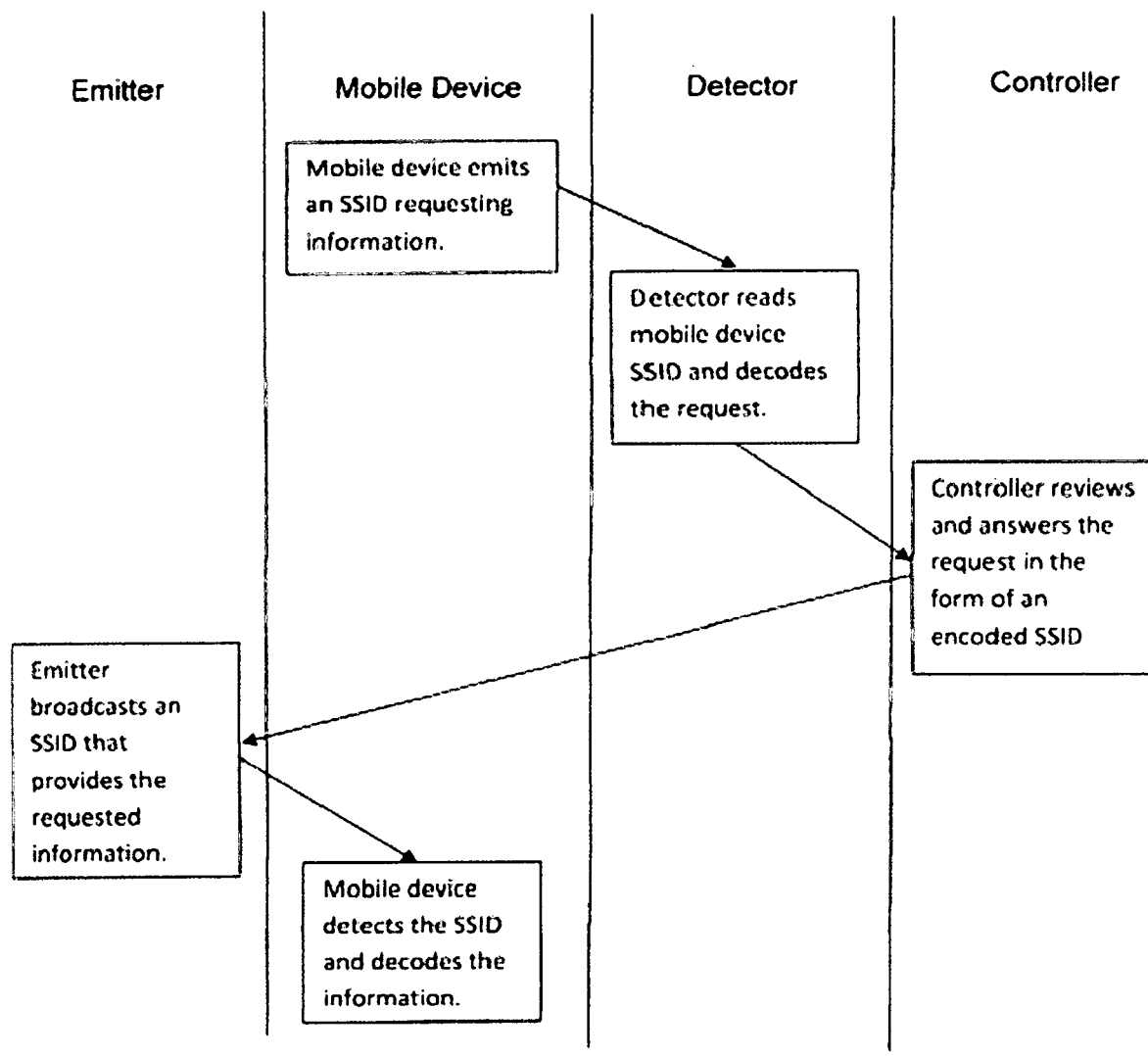
FIG. 6 illustrates a flow chart of the second embodiment of the communication system, depicting the operation of the system for a mobile device sending a request to an event promoter, and receiving a response from the promoter.

Referring to FIGS. 2 & 6, in a second embodiment of the invention a Mobile Device 103 sends a communication to a Controlling Station 101 by setting its SSID to a predetermined value. Using this method the Mobile Device 103 will emit an encoded SSID, which will be detected and decoded by the Detecting Stations 105. One example of a communication which a Mobile Device 103 would send at a concert event would be "what time does Band X start?" To communicate this message to the promoter, the user would enter the question into the Application 104 on the Mobile Device 103. The Application 104 would encode the Mobile Device's 103 unique identifier into a format that would be recognized by the Detecting Stations 105. An example of an encoded SSID would be "5555Q-What_Time_Does_Band_X_Start", where the "5555" identifies the unique identifier of the device, "Q" identifies that the devices has a question for the promoter, the "-" signifies that text is to follow, and "What_Time_Does_Band_X_Start" is the text of the question. After decoding the SSID, the Detecting Stations 105 would transmit the communication to the Controlling Station 101.

Once the promoter receives the communication, they could send a response using the communication method detailed above, and in FIGS. 1 & 5. For example, the promoter could enter the response "Band X Starts At 9" into the Controlling Station 101. The Controlling Station 101 would then encode the response into the form of an encoded SSID that the Mobile Device 103 would recognize. An example of an encoded SSID would be 5555A-Band_X_Starts_At_9, where the "5555" identifies the unique identifier of the device, "A" identifies that the SSID is encoded with an Answer for the device, the "-" signifies that text is to follow, and "Band_X_Starts_At_9" is the text of the Answer. The Emitting Station 102 would change its SSID to 5555A-Band_X_Starts_At_9 for a period of time so that the Mobile Device 103 will detect the encoded SSID and display the answer on the screen of the Mobile Device 103.

Figure 7:
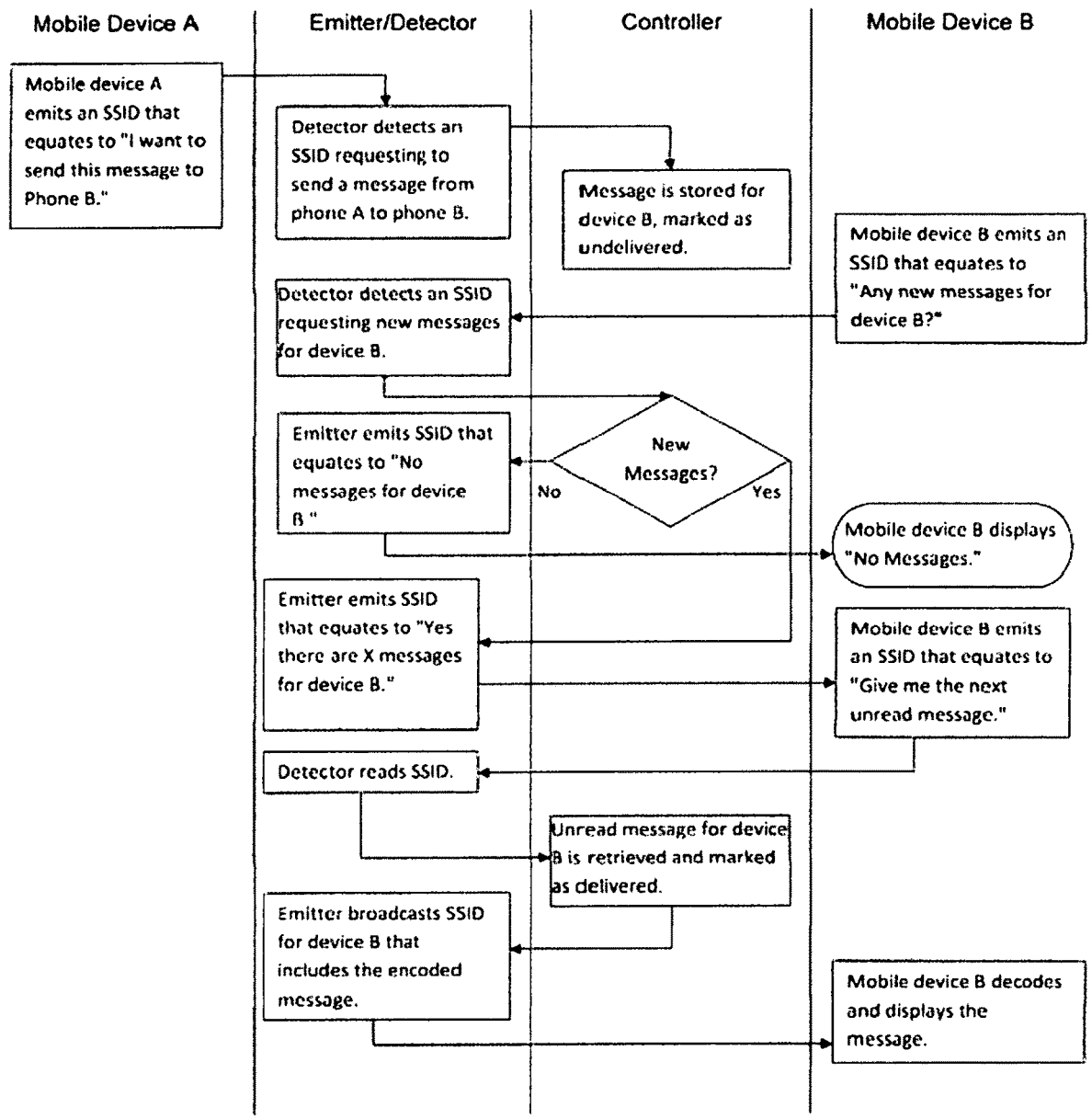
FIG. 7 illustrates a flow chart of the third embodiment of the communication system, depicting the operation of the system for a mobile device sending a communication to a second mobile device, and receiving a response from the second mobile device through an external emitter, detector and control system.

Referring to FIGS. 3 & 7, a third embodiment of the invention allows for messages to be delivered from a first Mobile Device 103 to a second Mobile Device 103 through the Detecting Stations 105, Controlling Station 101, and the Emitting Station 102. To send the message from the first Mobile Device 103, the Mobile Device 103 will emit an SSID encoded with a message intended to be delivered to a second Mobile Device 103. The encoded SSID will be detected and decoded by the Detecting Stations 105, and the message will be stored on the Controlling Station 101, until retrieved by the second Mobile Device 103. In order for the second Mobile Device 103 to retrieve its messages the Mobile Device 103 will emit an SSID encoded with an instruction to retrieve messages from the Controlling Station 101, which will be detected by a Detecting Station 105, decoded and relayed to a Controlling Station 101. The Controlling Station 101 will then encode the message stored from the first Mobile Device 103 into a SSID that will target the second Mobile Device 103, which will be momentarily emitted from the Emitting Station 102. The second Mobile Device 103 Application 104 will recognize the encoded SSID, decode the message from the SSID, and display the message on the second Mobile Device 103.

Referring to FIGS. 3 & 7, in the third embodiment of the invention the first Mobile Device 103 sends a communication to a second Mobile Device 103 by emitting an encoded SSID with the message to be sent and the unique identifier of the second Mobile Device 103, which will be detected and decoded by the Detecting Stations 105. One example of a communication which a first Mobile Device 103 with an identifier of 5555 would send at an event to a second Mobile Device 103 with a identifier of 8888 would be "meet at exit at 10." To communicate this message to the second Mobile Device 103, the first Mobile Device 103 user would enter the message into the Application 104 on the first Mobile Device 103. The Application 104 would encode the Mobile Device's 103 SSID into a format that would be recognized by the Detecting Stations 105. An example of an encoded SSID would be 5555TO8888-Meet_At_Exit_At_10, where the "5555" identifies the first Mobile Device, "TO" is an instruction that identifies that the message is meant to be sent to a second Mobile Device, "8888" identifies second Mobile Device, the "-" signifies that message is to follow, and "Meet_At_Exit_At_10" is the message. After decoding the SSID, the Detecting Stations 105 would transmit the communication to the Controlling Station 101.

Once the promoter receives the message, the promoter would retain the message until the second Mobile Device 103, retrieves the message from the Controlling Station 101. To retrieve the message, the second Mobile Device 103 will emit an encoded SSID with an instruction that the second Mobile Device 103 wants to retrieve messages for the device. The encoded SSID will be detected and decoded by the Detecting Stations 105. An example of an encoded SSID would be 8888RETRIEVE, where the "8888" identifies the unique identifier of the device and "RETRIEVE" identifies that the device wants to retrieve messages. The Controlling Station 101 controlling station would then receive the message from the device, recover any messages stored for the device, and transmit the message to the second Mobile Device 103 through an Emitting Station 102. For example, the Emitting Station 102 would change its SSID to 8888FROM5555-Meet_At_Exit_At_10, where the "8888" identifies the device receiving the message, the second Mobile Device, "FROM" is an instruction that identifies that the message is meant to be sent to a second Mobile Device, "5555" identifies the sender of the message, the first Mobile Device 103, the "–" signifies that message is to follow, and "Meet_At_Exit_At_10" is the message. The second Mobile Device 103 Application 104 will recognize the encoded SSID, decode the message from the SSID, and display the message on the second Mobile Device 103.

Figure 8:
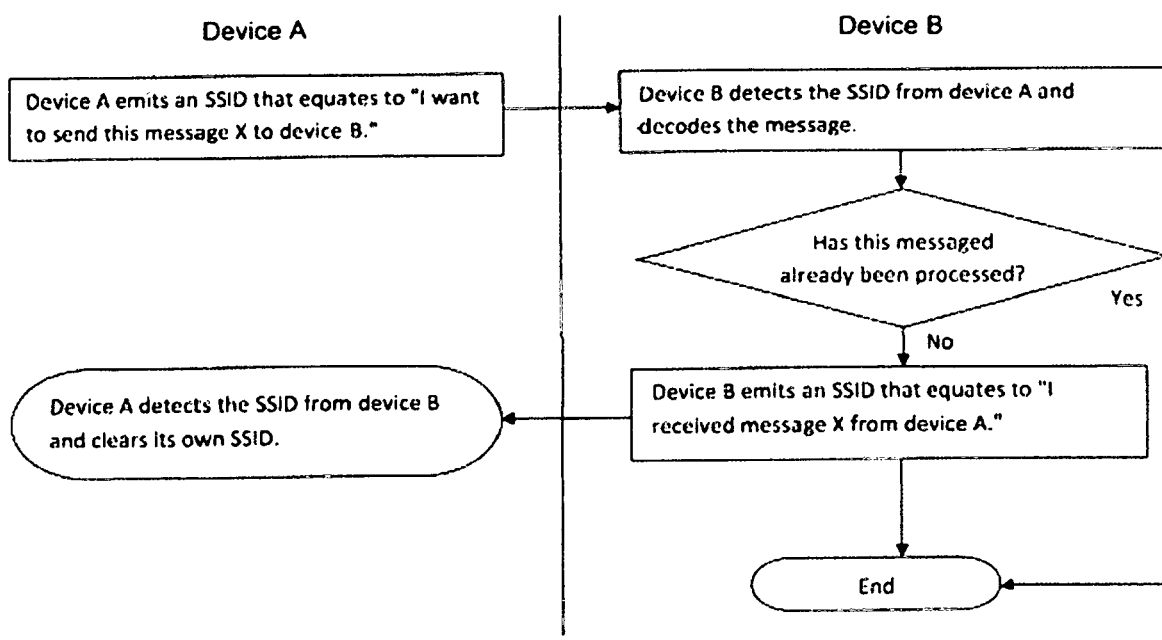
FIG. 8 illustrates a flow chart of the fourth embodiment of the communication system, depicting the operation of the system for a mobile device sending a communication directly to a second mobile device through an encoded SSID, and receiving a response from the second mobile device.

Referring to FIGS. 4 & 8, in the fourth embodiment of the invention the first Mobile Device 103 sends a communication to a second Mobile Device 103 by emitting an encoded SSID with the message to be sent and the unique identifier of the second Mobile Device 103, which will be detected and decoded by the second Mobile Device 103 and Application 104. The communication is directly between the first Mobile Device 103 and second Mobile Device 103. The Controlling Station 101, Emitting Station 102, and Detecting Station 105 are all contained within each mobile device. This is possible because, as discussed earlier, the Mobile Devices 103, are capable of emitting and detecting SSIDs. The limitation of this communication is the range of the signal which the mobile device can emit and detect. However, if the second device is in range of the first device, direct communication simplifies the process. This would be a useful communication method if the users could not easily talk directly to each other, due to loud music playing in the vicinity.

Referring to FIGS. 4 & 8, in the fourth embodiment of the invention the first Mobile Device 103 sends a communication to a second Mobile Device 103 by emitting an encoded SSID with the message to be sent and the unique identifier of the second Mobile Device 103, which will be detected and decoded by the Detecting Stations 105. One example of a communication which a first Mobile Device 103 with an identifier of 5555 would send at an event to a second Mobile Device 103 with a identifier of 8888 would be to "meet at exit at 10." To communicate this message to the second Mobile Device 103, the first Mobile Device 103 user would enter the message into the Application 104 on the first Mobile Device 103. The Application 104 would encode the Mobile Device's 103 SSID to a format that would be recognized by second Mobile Device 103. An example of an encoded SSID would be 8888FROM5555-Meet_At_Exit_At_10, where the "5555" identifies the first Mobile Device, "TO" is an instruction that identifies that the message is meant to be sent to a second Mobile Device, "8888" identifies second Mobile Device, the "–" signifies that message is to follow, and "Meet_At_Exit_At_10" is the message. When the first Mobile Device 103 is in range of the second Mobile Device 103 the encoded SSID will be detected and decoded by the second Mobile Device 103 and Application 104, and displayed on the device's screen.

Figure 9:
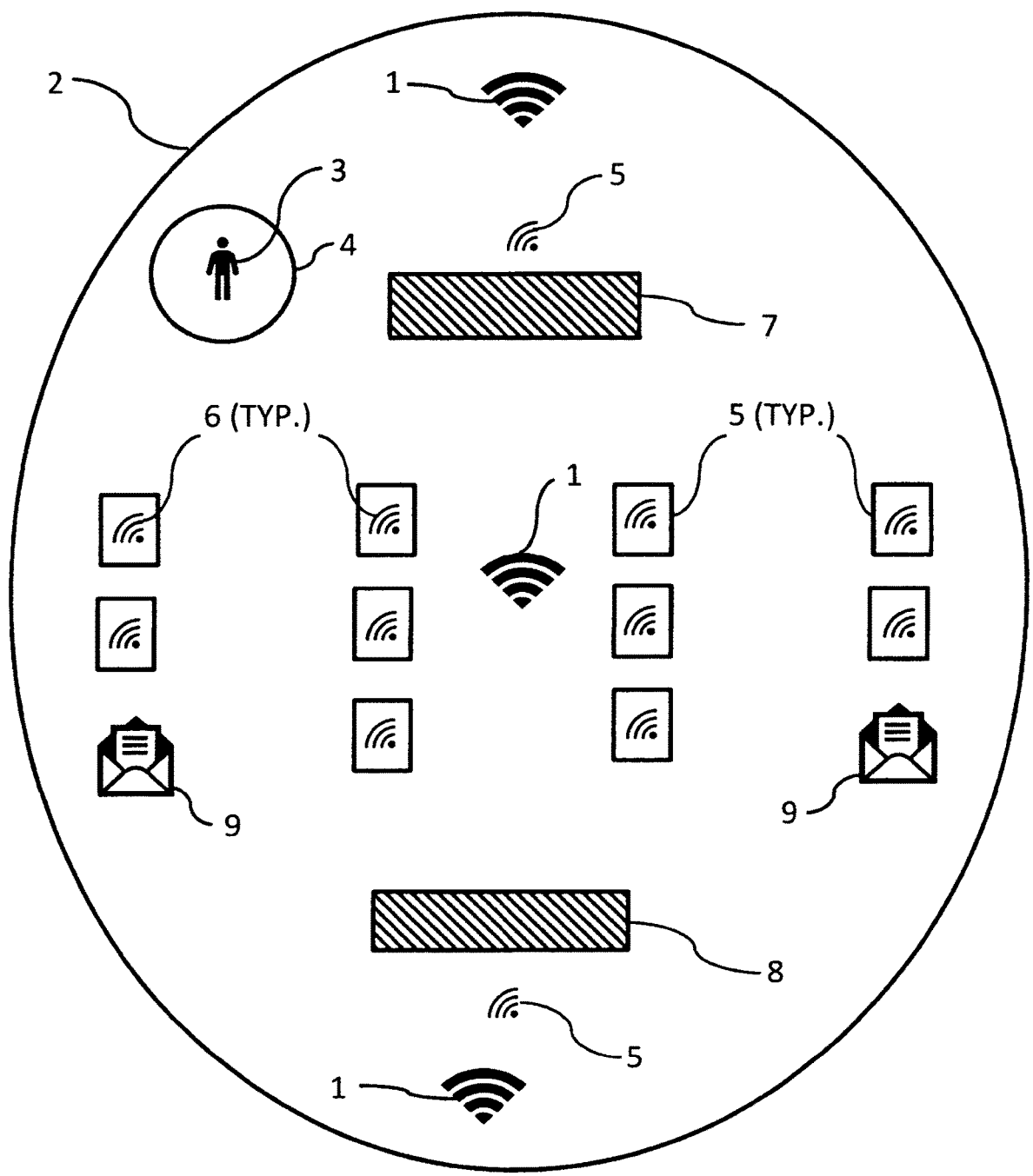
FIG. 9 illustrates an arrangement of a festival concert, and how the emitting and detecting devices could be arranged to successfully operate the communication system of the current invention.

FIG. 9 depicts an example of how the communication system of the current invention could be utilized at an event venue. The event venue of this example will have two stages, Stage A 7 and stage B 8, long range Emitting stations 1 which emit a signal 2 configured so that the range of the SSID covers the entire event venue are located throughout the venue. Detecting stations 5 are also located at each of the Stages 7, 8.

In addition to Stages A & B, 1,2, a plurality of marketing tents 6, are erected between Stages A & B, 1,2. The marketing tents sell various goods or promote various activities. Each marketing tent 6 is provided with a detecting station 5. There are also a messaging stations 9, each equipped with a short range emitters and detectors, located in the venue.

Attendee 3 arrives at the event, activates the Application Software 104 on her Mobile Phone and proceeds to Stage A 7 to watch Band X. Due to the vast number of attendees present at the event, Attendee's 3 Mobile Device cannot communicate with her cellular network. However, as Attendee 3 arrives in the venue, the Mobile Phone will enter into the range 2 of the emitting stations 1. The emitting stations 1 are emitting an encoded SSID 2 with an instruction to the personal mobile devices to start emitting an SSID 4 with it's unique identifier. When Attendee 3 arrives at Stage A 7 the range of their personal device SSID 3 will reach the detecting station(s) 5 for that stage, and the interaction decoded and sent to the Controlling Station 101, so that the promoter can track the activities of the Attendee 3, in real-time.

Attendee 3 does not care for Band Y, who follows Band X, and proceeds to Stage B 8, to watch Band N. On the way to Stage B, attendee stops at three marketing tents 6, each tent marketing a different product, and equipped with a detector 5. Each time attendee enters a tent 6, the detector 5 detects the individual unique identifier 4 of Attendee 3 and the interaction is decoded and sent to the Controlling Station 101, so that the promoter can track the activities of the Attendee 3, in real-time.

Before Attendee 3 arrives at Stage B 8, to watch Band N she wants to send a message to her friend that she has moved to from Stage A 7 to Stage B 8. To send the message to her friend, the Attendee 3 stops at a messaging station 9. Once the Attendee is within the messaging station 9, she will enter the message she wants to send to her friend and her friend's unique identifier into the Application 104, which the mobile device will momentarily transmit as an encoded SSID 4. The detector 5 detects the encoded SSID 4 of the Attendee 3 and the interaction is decoded and sent to the Controlling Station 101, which will be stored at the controlling station until the friend comes to a messaging station 9 to retrieve her messages. Once the momentary message transmission is complete, the mobile device will resume transmitting its personal device SSID 4.

When Attendee 3 arrives at Stage B 8 the range of their personal device SSID 3 will reach the detecting station(s) 5 for that stage, and the interaction is decoded and sent to the Controlling Station 101, so that the promoter can track the activities of the Attendee 3, in real-time.

Event promoters can now use the information made available by Attendee as well as other attendees utilizing the application software to make decisions around which bands and marketing tents to utilize for future events.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of communicating with mobile devices that are unable to connect with a wireless network connection due to network congestion comprising:

providing a plurality of mobile devices, said mobile devices having a unique identifier, a screen, detecting a wireless network signal over a range of area, and emitting a unique wireless network signal with an encoded mobile device network identifier, said mobile device also comprising an application loaded on the mobile device;

providing at least one emitting station which transmits at least one emitting station wireless network signal over a range of area identified with a network identifier, said network signal functionality being limited to transmitting an encoded network identifier and said network signal not allowing mobile devices to connect to the emitting station wireless network signal;

providing at least one detecting station which is detecting the mobile device wireless network signal emitted from the mobile devices and relaying the mobile device network identifier to a controlling station;

providing a controlling station which is instructing the emitting station to transmit an encoded network identifier and is receiving relayed mobile device network identifiers from detecting stations;

encoding said emitting station network identifiers with at least one instruction instructing the mobile device to the emit the mobile device wireless network signal encoded with the mobile device unique identifier in the mobile device network identifier;

said mobile devices detecting the encoded emitting station network identifier, but not establishing a connection to the network signal, when the mobile devices are located in the range of the emitting stations;

said application loaded on the mobile device recognizing the emitting station wireless network signal, decoding the instructions encoded in the emitting station network identifier and executing the instruction to emit the mobile device wireless network signal encoded with the mobile device unique identifier while the mobile device has not established a connection to the encoded emitter wireless network signal;

said detecting station detecting the mobile device wireless network signal and identifying the mobile device by the mobile device unique identifier when the mobile device is located in range of the detecting station.

* * * * *